US011333177B2

(12) United States Patent
Scheibe

(10) Patent No.: US 11,333,177 B2
(45) Date of Patent: May 17, 2022

(54) VENT WITH VALVE

(71) Applicant: Buerkert Werke GmbH & Co. KG, Ingelfingen (DE)

(72) Inventor: Ralf Scheibe, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 0 days.

(21) Appl. No.: 17/104,979

(22) Filed: Nov. 25, 2020

(65) Prior Publication Data
US 2021/0156406 A1 May 27, 2021

(30) Foreign Application Priority Data

Nov. 25, 2019 (DE) ...................... 10 2019 131 851.3

(51) Int. Cl.
| F15B 21/04 | (2019.01) |
| F15B 21/08 | (2006.01) |
| F16K 37/00 | (2006.01) |
| F16K 31/06 | (2006.01) |
| F16K 11/052 | (2006.01) |

(Continued)

(52) U.S. Cl.
CPC .............. *F15B 21/04* (2013.01); *F15B 21/08* (2013.01); *F16K 11/0525* (2013.01); *F16K 11/0856* (2013.01); *F16K 27/003* (2013.01); *F16K 31/0641* (2013.01); *F16K 37/005* (2013.01); *F15B 2211/405* (2013.01); *F15B 2211/40592* (2013.01); *F15B 2211/505* (2013.01); *F15B 2211/56* (2013.01); *F15B 2211/86* (2013.01)

(58) Field of Classification Search
CPC ............. F16K 11/0525; F16K 11/0856; F16K 37/005; F16K 31/0627; F16K 27/003; F16K 31/0682; F16K 31/10; F16K 7/16; F16K 31/0655; F16K 31/0675; F16K 31/44; F16K 31/0641; F15B 2211/505; F15B 2211/56; F15B 2211/86; F15B 13/086; F15B 2211/6306; F15B 2211/6343; F15B 21/04; F15B 21/08; F15B 2211/405; F15B 2211/40592; F15B 13/0814
See application file for complete search history.

(56) References Cited

U.S. PATENT DOCUMENTS

| 7,051,757 B2 | 5/2006 | McMillan et al. ......... 137/487.5 |
| 2008/0115844 A1* | 5/2008 | Teichmann ............. F15B 21/08 137/557 |

(Continued)

FOREIGN PATENT DOCUMENTS

| DE | 380530 | 9/1923 | |
| DE | 10248616 | 5/2004 | ............. F16K 31/04 |

(Continued)

*Primary Examiner* — Atif H Chaudry
(74) *Attorney, Agent, or Firm* — Hayes Soloway P.C.

(57) ABSTRACT

A valve has a housing which has at least two fluid openings, through which fluid can flow, and a further opening, at least one valve seat which is assigned to one of the fluid openings, and at least one closure member which is adjustable to release and/or close the at least one valve seat, the at least one valve seat which adjoins a cavity through which fluid can flow being formed on a housing part. The valve includes a sensor device which closes the opening in a fluid-tight manner and can acquire data about the fluid is arranged in the further opening. A valve island is furthermore described.

12 Claims, 4 Drawing Sheets

(51) Int. Cl.
  *F16K 11/085* (2006.01)
  *F16K 27/00* (2006.01)

(56) References Cited

U.S. PATENT DOCUMENTS

| 2014/0299201 | A1* | 10/2014 | Hirose | F16K 27/003 |
| | | | | 137/240 |
| 2016/0377193 | A1* | 12/2016 | Scherer | F16K 1/12 |
| | | | | 137/554 |
| 2017/0254435 | A1* | 9/2017 | Ohta | F16K 31/0682 |

FOREIGN PATENT DOCUMENTS

| DE | 112004001045 | 5/2006 | ............. F16K 31/12 |
| DE | 102014226416 | 6/2016 | ............... G01F 1/05 |

\* cited by examiner

VENT WITH VALVE

FIELD OF THE INVENTION

The invention relates to a valve according to the preamble of the main claim and to a valve island.

BACKGROUND OF THE INVENTION

Generic valves are usually intended to control a fluid flow. Depending on the field of application of the valve, it is desirable to install one or more sensor device(s) in the valve, which allows the acquisition of a wide variety of data about the fluid flowing in the valve.

In generic valves, additionally incorporated cavities in the housing are used to integrate the sensor device there. However, mounting and detaching turns out to be difficult as the sensor device is difficult or impossible to reach from outside the valve.

The object of the invention is to create a valve in which at least one sensor device can be easily mounted and detached.

SUMMARY OF THE INVENTION

The present invention provides a valve, comprising
a housing having at least two fluid openings through which fluid can flow, and a further opening,
at least one valve seat assigned to one of the fluid openings, and
at least one closure member which is adjustable to release and/or close the at least one valve seat,
the at least one valve seat which adjoins a cavity through which a fluid can flow being formed on a housing part,
wherein a sensor device which closes the opening in a fluid-tight manner and can acquire data about the fluid is arranged in the further opening.

Due to the arrangement of the sensor device in a further opening, the sensor device is easily accessible from outside the valve, which ensures easy mounting and detaching of the sensor device.

For example, the sensing device includes a pressure sensor, a temperature sensor and/or a velocity sensor. The sensor is in direct fluid contact. It is thus possible to easily measure the pressure, temperature and/or velocity or flow rate of the fluid.

In particular, the further opening is a fluid opening which is anyway provided but unused. For example, a 3-2-way valve can easily be used for a 2-2-way valve, in which the further opening is used to insert the sensor device. In the case under consideration here, the further opening is thus no longer needed as a fluid opening. By arranging the sensor device in this unused fluid opening, there is no need to provide a separate installation space for the sensor device, and the effort for sealing the unused fluid opening can be reduced. The sensor device thus serves as a seal in addition to the data acquisition.

The valve may be a solenoid valve, in particular a rocker valve and/or a diaphragm valve. Such designs are particularly suitable for a valve which is intended to have two switching positions and at least two connections.

For example, the valve is a rocker valve, having a rocker the ends of which are each assigned to a valve seat, the further opening being arranged centrally between the two valve seats. A rocker valve can be configured to be very compact and efficiently provide a valve having at least two switching positions and two ways.

According to one aspect, at least a part of the sensor device constitutes a section of an inner side of the housing and continues the inner side in the area of the further opening, in particular without a step. Thus, the space which is partly delimited by the inner wall, is not reduced. This arrangement is particularly useful when the inner wall is in contact with fluid, since the flow cross-section for the fluid flow is not reduced and the fluid flow is hardly or not at all disturbed.

The housing can include a valve seat plate. The valve seat plate has the valve seats attached or molded thereto, which cooperate with the closure member to control the fluid flow.

In one embodiment, the sensor device protrudes through the valve seat plate. In this way, the sensor device can be flush with the valve seat plate on the fluid side and is easily accessible on the opposite side to the fluid side.

A further embodiment provides that a fluid connection plate having connection channels is provided on the rear side of the valve seat plate, a separate connection channel being provided in the fluid connection plate for each fluid opening. Fluid can be conducted into the cavity or drained from the cavity through the fluid connection plate. The fluid connection plate can also be used as a mounting base for the housing.

In particular, the valve seat plate and the fluid connection plate are separate components. This allows the housing to be easily mounted to the fluid connection plate or detached from the fluid connection plate.

According to one aspect, the sensor device protrudes into or through a receiving opening in the fluid connection plate which is aligned with the further opening. Depending on the design of the fluid connection plate, a sensor device is suitable which protrudes into the fluid connection plate or through the fluid connection plate. If the sensor device protrudes through the fluid connection plate, the sensor device is also accessible from the side of the fluid connection plate opposite the valve seat plate, for example, for the coupling of an electrical connection. If the sensor device merely protrudes into the fluid connection plate, the sensor device and the fluid connection plate can be made very compact.

One aspect provides that an electrical connection is provided in the fluid connection plate on the side facing the valve seat plate, in particular in the receiving opening, to which the sensor device can be coupled in terms of signaling, in particular via a plug connection or a resting contact with exposed contact surfaces, for example a printed circuit board. In this way, the sensor device can be easily and quickly coupled and decoupled with respect to the electrical connection in terms of signaling. In addition, the fluid connection plate can be made very compact.

It may be provided that the plug connection or the resting contact is automatically coupled when the fluid connection plate is fastened to the valve seat plate and automatically decoupled when the fluid connection plate is decoupled from the valve seat plate in that respective connection parts coming into contact with each other are fixedly attached to either the fluid connection plate or the valve seat plate. In other words, during mounting or detaching of the fluid connection plate with respect to the valve seat plate, the plug connection or resting contact is simultaneously established or released and, consequently, the sensor device is electrically coupled or decoupled from the electrical connection. This permits easy fastening and release of the fluid connection plate with respect to the valve seat plate and consequently a very easy mounting and detaching of the valve.

In particular, the further opening and the receiving opening form a receiving space in which the sensor device and the electrical connection or only the sensor device is accommodated. The accommodation can be realized by a positive fit, or the sensor device and/or the electrical connection is fastened to the corresponding component (fluid connection plate or valve seat plate) in a non-positive manner, for example using separate fasteners such as screws or rivets, or by intermaterial bonding, for example by gluing or welding.

Optionally, a seal is arranged between a wall of the further opening and the sensor device, which encloses the sensor device circumferentially. This reliably prevents fluid from escaping from the cavity of the housing through which fluid flows.

According to the invention, the object is furthermore achieved by a valve island comprising a plurality of valves of the aforementioned type, a common fluid connection plate being provided, on which a plurality of valve seat plates of assigned valves are seated. By placing the sensor devices in the (already existing) openings of the fluid connection plate and the valve seat plates, a very compact design of the valve island can be achieved.

The described advantages and features of the valve according to the invention apply equally to the valve island and vice versa.

DETAILED DESCRIPTION OF THE INVENTION

Figure 1:
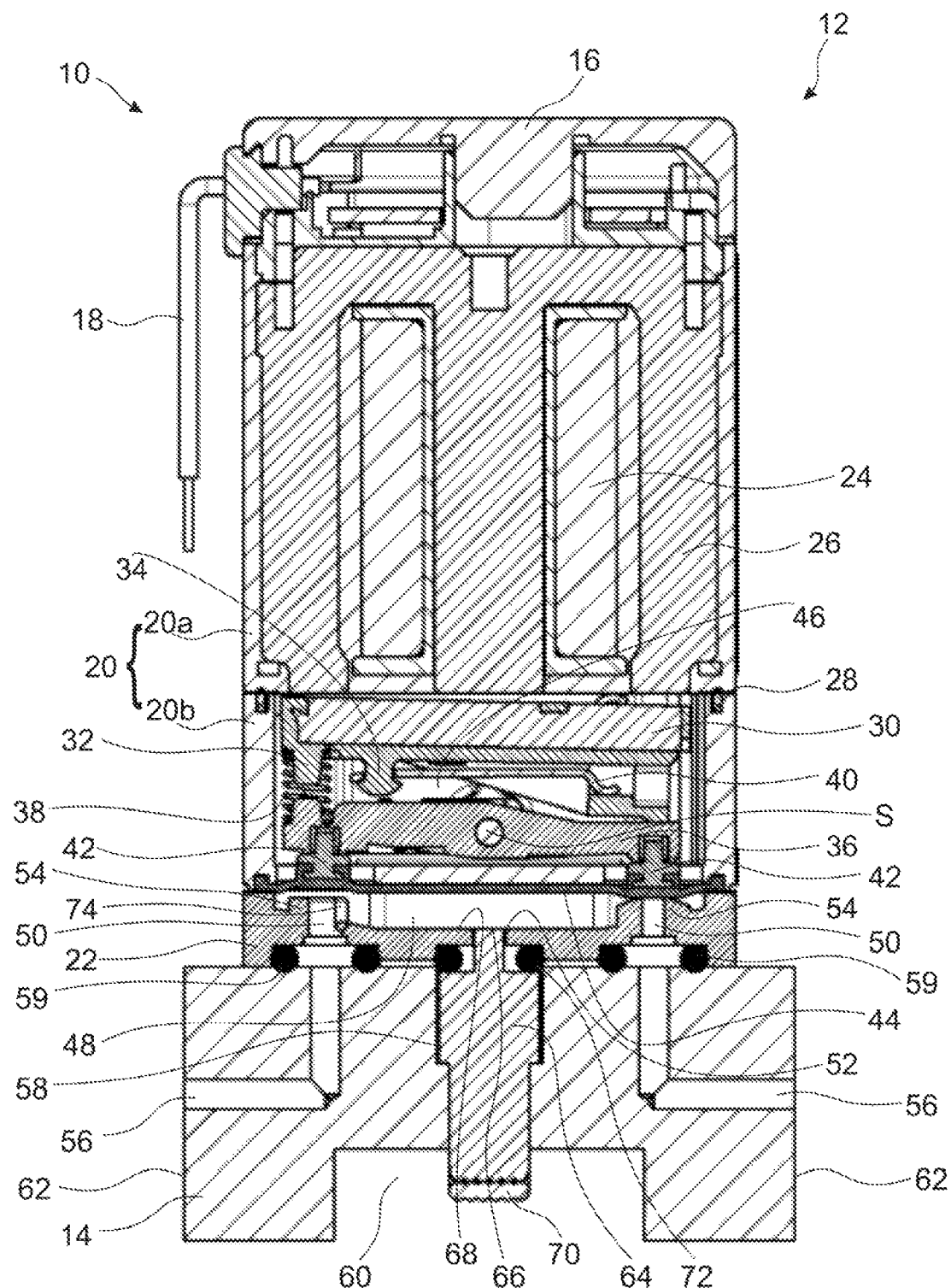
FIG. 1 shows a sectional view of a first embodiment of a valve according to the invention.

FIG. 1 shows a first embodiment of a valve 10 mounted on a fluid connection plate 14. Here, the valve 10 is configured as a solenoid valve, in particular as a rocker and diaphragm valve.

The valve 10 has a housing 12, which has a plurality of housing parts, namely a cover 16, on which an electrical connection 18 is provided for the valve 10, an actuator housing 20, which in turn comprises a coil housing 20a and a rocker housing 20b, and a valve seat plate 22.

An electromagnetic coil 24 is arranged in the coil housing 20a, and the rest of the interior of the coil housing 20a is filled by a yoke 26.

A housing seal 28 is provided between the coil housing 20a and the rocker housing 20b.

A vertically movable, magnetic or magnetizable transmission part 30 is arranged in an upper area of an interior of the rocker housing 20b and has on its lower side a downwardly projecting armature 32 and a downwardly projecting lug 34.

A rocker 36 which can be rotated or tilted about a swivel axis S is arranged below the transmission part 30.

Two springs are arranged between the transmission part 30 and the rocker 36.

A return spring 38 is supported on the lower side of the transmission part 30 and on an upper side of the rocker 36, the armature 32 extending into the interior of the sleeve-type return spring 38.

A leaf spring 40 which extends substantially horizontally and is supported with its free end on the upper side of the rocker 36 is attached to the lug 34.

The rocker 36 is substantially formed of two rocker arms, the free ends of which are each provided with a tappet 42 which projects substantially downward from its respectively assigned rocker arm.

The tappets 42 are connected to a sealing element 44, which is configured as a sealing diaphragm and is clamped between the rocker housing 20b and the valve seat plate 22. The sealing element 44 extends substantially over an entire lower or upper side of the rocker housing 20b or the valve seat plate 22, respectively.

Due to the sealing element 44, an actuating space 46 formed by the rocker housing 20b and a cavity 48 through which fluid can flow and which is formed by the valve seat plate 22 are fluidically separated from each other. In other words, the sealing element 44 constitutes a barrier to fluid between the valve seat plate 22 and the actuator housing 20.

The valve seat plate 22 has three through openings which extend substantially vertically through the valve seat plate 22. Two of these openings are flown through by a fluid, so that they are referred to as fluid openings 50 in the following. The other opening is referred to as further opening 52.

The valve seat plate 22 is shaped such that a valve seat 54 facing one of the tappets 42 is formed at each fluid opening 50. The valve seats 54 are thus each assigned to one tappet 42 and one fluid opening 50.

Three connection channels are provided in the fluid connection plate 14, each of which is assigned to one of the openings 50, 52. The connection channels which are assigned to the fluid openings 50 are referred to as fluid connection channels 56 in the following. The other connection channel is referred to as receiving opening 58.

The fluid channels 56 extend from the upper side of the fluid connection plate 14 through the fluid connection plate 14 and open to the outside at a lateral outer side 62 of the fluid connection plate 14.

A seal 59 is arranged between the valve seat plate 22 and the fluid connection plate 14 in the area of the fluid openings 50 and the fluid connecting channels 56, respectively. The seals 59 are configured as sealing rings and are each arranged circumferentially around the inlet opening of a fluid connection channel 56.

The receiving opening 58 is located centrally of the fluid openings 50 and extends substantially vertically from an upper side of the fluid connection plate 14 facing the valve seat plate 22, to a lower area in which the receiving opening 58 widens and extends substantially horizontally (into and out of the image plane) along the entire lower side of the fluid connection plate 14. The wider area of the receiving opening 58 is used for cable routing 60.

The further opening 52 and the receiving opening 58 form a receiving space in which a sensor device 64 is accommodated.

The sensor device 64 extends vertically through the complete fluid connection plate 14 and with an upper thinner section into the further opening 52 such that an upper end face 66 of the sensor device 64 is flush with a fluid contacting upper side 68 of the valve seat plate 22. In other words, the upper end face 66 continues the fluid contacting upper side 68 with substantially no step so that the upper end face 66 and the fluid contacting upper side 68 form a common continuous fluid contacting surface which forms part of the boundary of the cavity 48 through which fluid can flow. The upper side 68 constitutes an inner side of the housing 12.

The sensing device 64 includes for example a pressure sensor to sense the fluid pressure. The pressure sensor is arranged such that it is in direct fluid contact but does not affect the fluid flow. Accordingly, the pressure sensor is provided in the upper area of the sensor device 64, where the pressure sensor is flush with the fluid contacting upper side 68 of the valve seat plate 22.

Alternatively or in addition, the sensor device 64 may include another type of sensor, such as a temperature or velocity sensor.

A connection component 70 to which an electrical connection, for example a cable, can be attached is provided at the lower end of the sensor device 64, as a result of which the sensor device 64 can be coupled to the electrical connection 76 in terms of signaling.

Similar to the seals 59 in the area of the fluid openings 50, a seal 72 is provided in the area of the further opening 52 between the valve seat plate 22 and the sensor device 64. The seal 72 is configured as a sealing ring and encloses the thinner section of the sensor device 64 circumferentially.

The sensor device 64 can be inserted loosely from the top into the receiving opening 58, the fastening being realized by means of a positive fit between the valve seat plate 22, the seal 72 and the fluid connection plate 14 when the valve 10 is mounted or, more precisely, when the fluid connection plate 14 and the valve seat plate 22 are assembled. Upon detachment, when the valve seat plate 22 is removed, the seal 72 can be easily removed, on the one hand, and, on the other hand, the sensor device 64 can be easily withdrawn from the receiving opening 58.

It is of course also possible to provide that the sensor device 64 is attached to the valve seat plate 22 and/or the fluid connection plate 14, e.g., in a non-positive manner using separate fasteners (e.g., screws or rivets) or by intermaterial bonding by welding, gluing, or similar.

In the following, the function of the valve 10 is described.

Fluid is conducted through one of the fluid connection channels 56 or through both fluid connection channels 56 to the assigned fluid openings 50, or is drained from the assigned fluid openings 50. To this end, further fluid openings 50 may optionally be provided in the rocker housing 20b or in the valve seat plate 22.

In the first, de-energized switching position of the rocker 36 shown in FIG. 1, the left tappet 42 is spaced from its assigned left valve seat 54, so that the sealing element 44 does not contact the left valve seat 54. The right tappet, on the other hand, is moved towards its assigned right valve seat 54, as a result of which it presses the sealing element 44 against the right valve seat 54. In this position, the right fluid opening 50 is thus fluidically decoupled from the cavity 48 through which fluid can flow, and the left fluid opening 50 is connected in terms of flow to the cavity 48 through which fluid can flow.

By applying an electrical voltage to the coil 24, the magnetic or magnetizable transmission part 30 is moved away from the coil 24. As a result, the armature 32 and the lug 34 of the transmission part 30 are moved against the pretensioning force of the leaf spring 40 against the left rocker arm of the rocker 36, which partially relaxes the return spring 38 and tilts the rocker 36 counterclockwise about the swivel axis S. The right tappet 42 and part of the sealing element 44 in the area of the right valve seat 54 are thus moved substantially vertically away from the right valve seat 54, so that the right fluid opening 50 is connected in terms of flow to the cavity 48 through which fluid can flow. The left tappet 42 and part of the sealing element 44 in the area of the left valve seat 54 are moved substantially vertically downwards until the sealing element 44 rests on the left valve seat 54.

In the embodiment shown here, the left valve seat 54 is designed as a blind seat. This seat has laterally an opening 74, which fluidically connects the left fluid opening 50 with the cavity 48 through which fluid can flow, even when the sealing element 44 rests on the left valve seat 54. The fluidic coupling of the left fluid opening 50 is thus independent of the switching position of the rocker 36.

Depending on the switching position, the rocker 36 thus decouples only the right fluid opening 50 from the cavity 48 through which fluid can flow.

When the current flow through the coil 24 stops, the pushing off of the transmission part 30 in the direction of the rocker 36 is stopped, and due to the restoring force of the leaf spring 40, the transmission part 30 is moved upwards in the direction of the coil 24. Since the spring force of the return spring 38 is directed such that the transmission part 30 and the rocker 36 are moved against each other and the transmission part 30 is moved away from the rocker 36 due to the leaf spring 40, the left rocker arm and thus the left tappet 42 and part of the sealing element are moved away from the left valve seat 54 via the return spring 38. The initial position is thus reached.

The rocker 36 and/or the sealing element 44 may thus be referred to as a closure member.

Without the sensor device 64, the further opening 52 functions as a fluid opening, and the receiving opening 58 and the cable routing 60 function as a fluid connection channel. Fluid can thus flow through the further opening 52, the receiving opening 58, and the cable routing 60. However, if this is not desired, the unused fluid opening 52 and the unused fluid connection 58, 60 can be used to integrate the sensor device. Thus, on the one hand, it is not necessary to use a new valve seat plate 22 having only two fluid openings and, on the other hand, it is not necessary to provide further components to seal the further opening 52 and additional receiving space for the integration of the sensor device 64.

Figure 2:
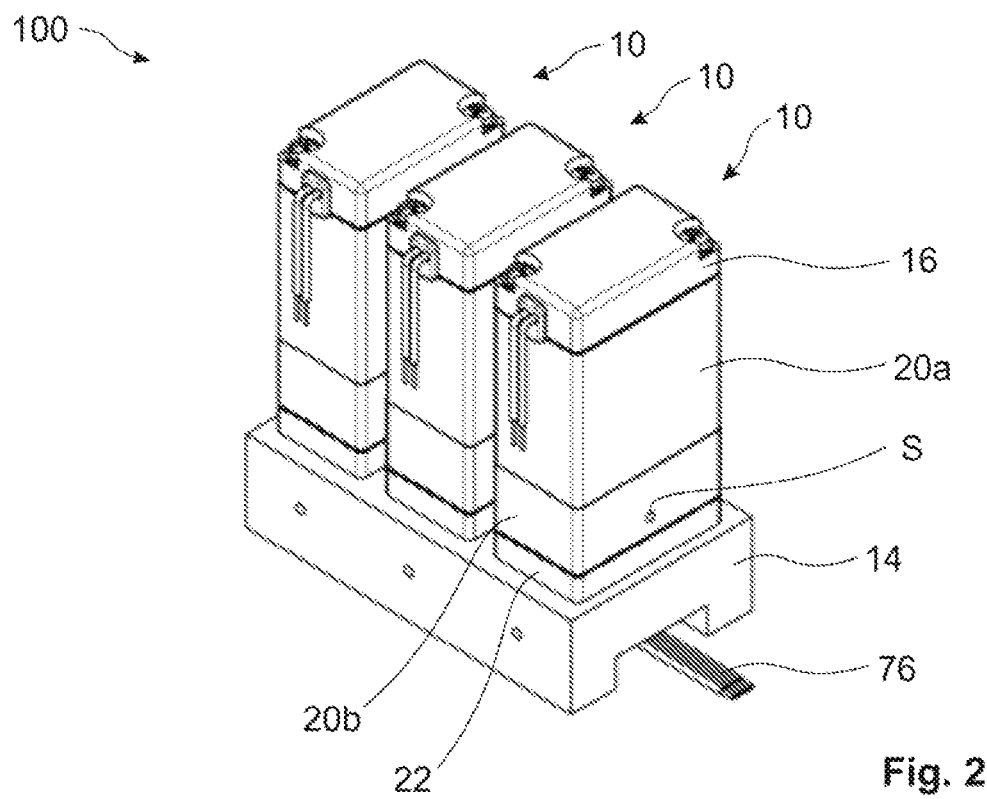
FIG. 2 shows a perspective view of a first embodiment of a valve island according to the invention having three valves of the invention according to FIG. 1.
Figure 3:
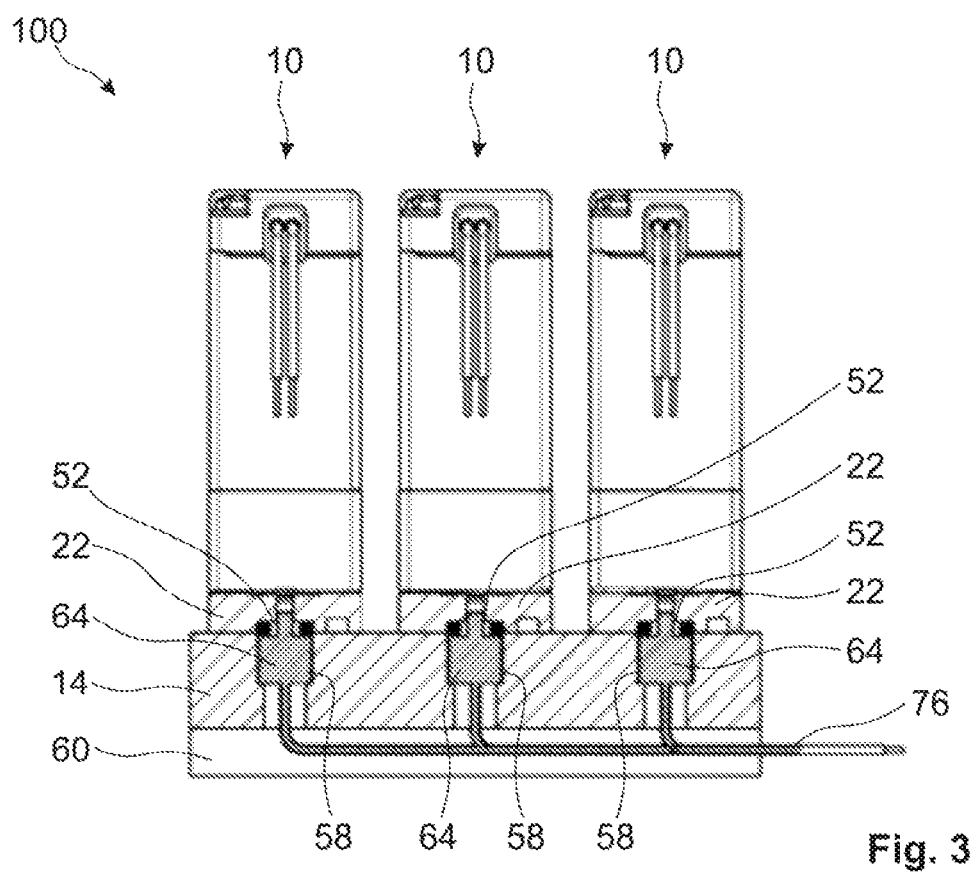
FIG. 3 shows a sectional view of the first embodiment of the valve island of the invention according to FIG. 2.

FIGS. 2 and 3 show a valve island 100 including three valves 10, which are arranged on a common fluid connection plate 14.

A plurality of electrical connections 76 in the form of cables to the individual valves 10 extend through the cable routing 60.

FIG. 3 shows that the individual electrical connections 76 are each assigned to a valve 10 or to a sensor device 64 of a valve 10 and are connected to the lower end of the sensor device 64. Each sensor device 64 is located in a separate receiving space, which is formed by the further opening 52 in the valve seat plate 22 and the receiving opening 58 in the fluid connection plate 14.

The individual receiving openings 58 extend substantially vertically through the fluid connection plate 14, and the cable routing 60 extends continuously substantially horizontally on the lower side of the fluid connection plate 14.

The swivel axis S of the rocker 36 extends through the rocker housing 20b (see FIG. 2).

The rocker housing 20b can optionally have a fluid opening 50 through which fluid can flow into or out of valve 10.

Figure 4:
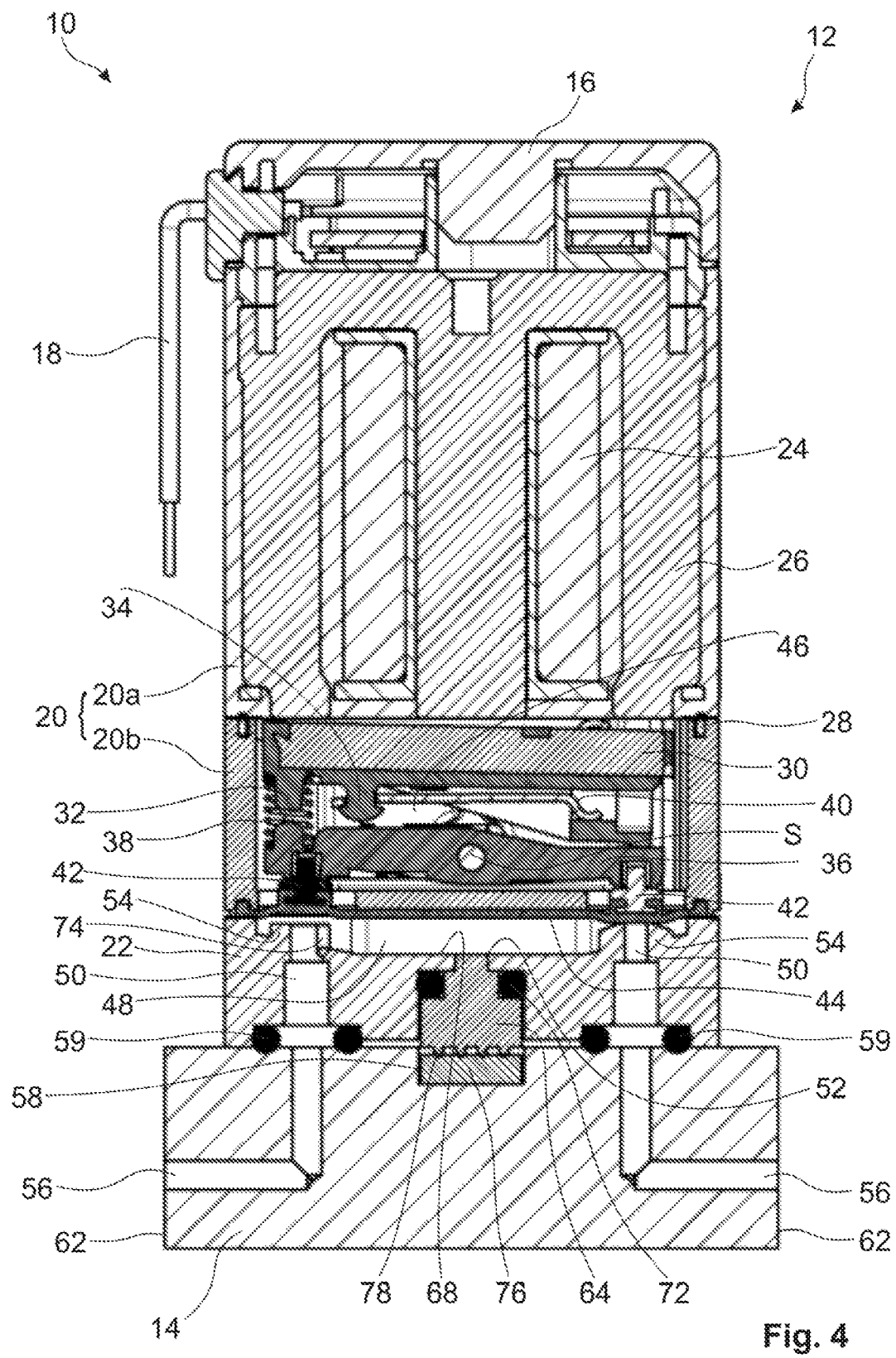
FIG. 4 shows a sectional view of a second embodiment of the valve according to the invention.
Figure 5:
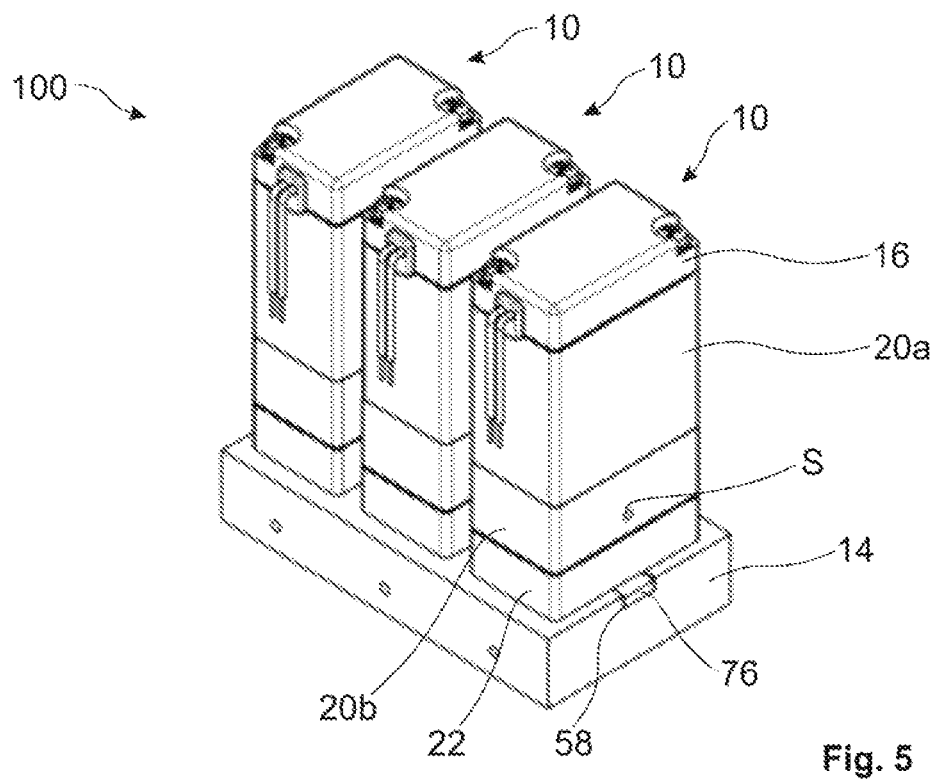
FIG. 5 shows a perspective view of a second embodiment of the valve island according to the invention having three valves of the invention according to FIG. 4.
Figure 6:
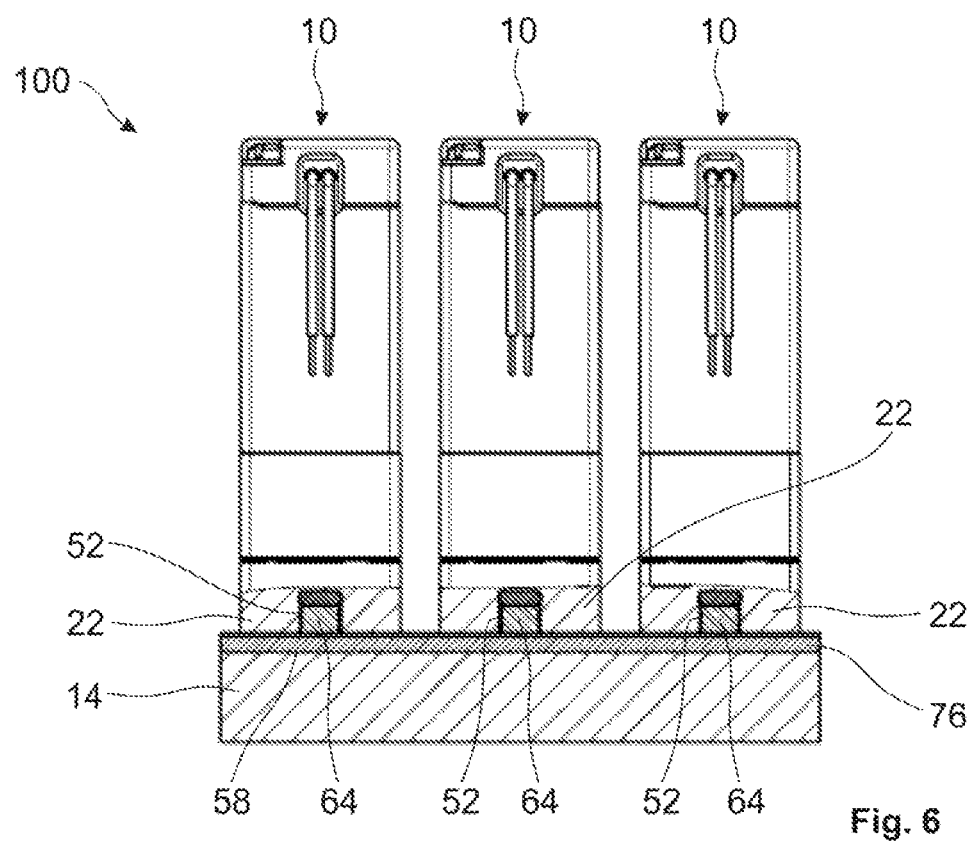
FIG. 6 shows a sectional view of the second embodiment of the valve island of the invention according to FIG. 5.

FIGS. 4 to 6 show a second embodiment of the valve 10, which is almost identical to the first embodiment of the valve 10, except for the sensor device 64 and the electrical connection 76. Accordingly, only the differences are discussed below, and identical or functionally identical parts are marked with the same reference numerals.

Here, the sensor device 64 is mainly accommodated in the further opening 52 of the valve seat plate 22 and extends vertically through the complete valve seat plate 22. Only contact pins 78 located on the lower side of the sensor device 64 project into the receiving opening 58 of the fluid connection plate 14.

An electrical connection 76 in the form of a printed circuit board with exposed contacts is accommodated in the receiving opening 58.

The contact pins 78 contact the exposed contacts of the printed circuit board when the valve seat plate 22 and the fluid connection plate 14 are fastened, as a result of which the sensor device 64 is coupled to the electrical connection 76 in terms of signaling.

Instead of the resting contact described above, a plug connection may also be provided between the sensor device 64 and the electrical connection 76. For this purpose, the printed circuit board can include contact sockets into which the contact pins 78 of the sensor device 64 can be inserted, thus coupling the sensor device 64 to the electrical connection 76 in terms of signaling.

The sensor device 64 and the electrical connection 76 can be inserted loosely in the further opening or in the receiving opening 58, respectively, the fastening of both parts being realized by a positive fit between the valve seat plate 22, the seal 72 and the fluid connection plate 14 when mounting the valve 10 or more precisely when assembling the fluid connection plate 14 and the valve seat plate 22. Upon detachment, when the valve seat plate 22 is removed, the sensor device 64 can be easily taken out of the further opening 52, and the electrical connection 76 can easily be removed from the receiving opening 58.

It is of course also possible to provide that the sensor device 64 and/or the electrical connection 76 is/are attached to the valve seat plate 22 or to the fluid connection plate 14, respectively, e.g., in a non-positive manner using separate fasteners (e.g., screws or rivets) or by intermaterial bonding by welding, soldering, gluing, or similar.

FIGS. 5 and 6 show a second embodiment of the valve island 100, which has three valves 10 arranged on a common fluid connection plate 14.

The second embodiment of the valve island 100 corresponds to the first embodiment of the valve island 100, except for the sensor device 64 and the electrical connection 76. Accordingly, only the differences are discussed below, and identical or functionally identical parts are marked with the same reference numerals.

Instead of cables that are routed to the individual sensor devices 64 of the valves 10 in a cable routing 60, the electrical connection 76 of the second embodiment of the valve island 100 extends over the entire length of the fluid connection plate 14 in the form of a printed circuit board in the middle of the upper side of the fluid connection plate 14 facing the valve seat plate 22.

The printed circuit board is arranged on the upper side such that it runs below each sensor device 64 of the valves 10 and the sensor devices 64 contact the printed circuit board, for example via a resting or plug-in contact.

Then invention claimed is:

1. A valve, comprising
    a housing having at least two fluid openings through which fluid can flow, and a further opening,
    at least one valve seat assigned to one of the fluid openings, and
    at least one closure member which is adjustable to release and/or close the at least one valve seat,
    the at least one valve seat which adjoins a cavity through which a fluid can flow being formed on a housing part,
    wherein a sensor device Which closes the opening in a fluid-tight manner and can acquire data about the fluid is arranged in the further opening,
    wherein the valve is a solenoid valve, and
    wherein the valve is a rocker valve, including a rocker, the ends of which are each assigned to a valve seat, the further opening being arranged centrally between the two valve seats.

2. The valve according to claim 1, wherein the valve is a diaphragm valve.

3. The valve according to claim 1, wherein at least a part of the sensor device constitutes a section of an inner side of the housing and continues the inner side in the area of the further opening.

4. The valve according to claim 1, wherein the housing comprises a valve seat plate.

5. The valve according to claim 4, wherein the sensor device projects through the valve seat plate.

6. The valve according to claim 4, wherein a fluid connection plate including connection channels is provided on the rear side of the valve seat plate, a separate connection channel being provided in the fluid connection plate for each fluid opening.

7. A valve, comprising
    a housing having at least two fluid openings through which fluid can flow, and a further opening,
    at least one valve seat assigned to one of the fluid openings, and
    at least one closure member which is adjustable to release and/or close the at least one valve seat,
    the at least one valve seat which adjoins a cavity through which a fluid can flow being formed on a housing part,
    wherein a sensor device which closes the opening in a fluid-tight manner and can acquire data about the fluid is arranged in the further opening,
    wherein the housing comprises a valve seat plate,
    wherein a fluid connection plate including connection channels is provided on the rear side of the valve seat plate, a separate connection channel being provided in the fluid connection plate for each fluid opening, and
    wherein the sensor device projects into or through a receiving opening in the fluid connection plate which is aligned with the further opening.

8. A valve, comprising
    a housing having at least two fluid openings through which fluid can flow, and a further opening,
    at least one valve seat assigned to one of the fluid openings, and
    at least one closure member which is adjustable to release and/or close the at least one valve seat,
    the at least one valve seat which adjoins a cavity through thich a fluid can flow being formed on a housing part,
    wherein a sensor device which closes the opening in a fluid-tight manner and can acquire data about the fluid is arranged in the further opening, wherein the housing comprises a valve seat plate, wherein a fluid connection plate including connection channels is provided on the rear side of the valve seat plate, a separate connection channel being provided in the fluid connection plate for each fluid opening, and wherein an electrical connection is provided in he fluid connection plate on the side facing the valve seat plate, to which the sensor device can be coupled in terms of signaling.

9. The valve according to claim 8, the sensor device can be coupled in terms of signaling via a plug connection or a resting contact with exposed contact surfaces.

10. The valve according to claim 9, wherein the plug connection or the resting contact is automatically coupled when the fluid connection plate is fastened to the valve seat plate and is automatically decoupled when the fluid connection plate is released from the valve seat plate, in that respective connection parts coming into contact with each another are fixedly attached either to the fluid connection plate or to the valve seat plate.

11. The valve according to claim 1, wherein a seal which circumferentially encloses the sensor device is arranged between a wall of the further opening and the sensor device.

12. A valve island including a plurality of valves according to claim 1, wherein a common fluid connection plate is provided, on which a plurality of valve seat plates of assigned valves are seated.

* * * * *